United States Patent [19]
Davis

[11] 3,986,203
[45] Oct. 12, 1976

[54] METHOD AND APPARATUS FOR TESTING TELEVISION RECEIVERS

[76] Inventor: John C. Davis, 1605 Stuart, Albany, Ga. 31707

[22] Filed: Dec. 3, 1975

[21] Appl. No.: 637,218

[52] U.S. Cl. ............................................... 358/10
[51] Int. Cl.² ........................................ H04N 9/62
[58] Field of Search .................. 358/10; 178/DIG. 4

[56] References Cited
UNITED STATES PATENTS
3,816,653   6/1974   Bosiger ..................... 178/DIG. 4

*Primary Examiner*—Robert L. Griffin
*Assistant Examiner*—Aristotelis M. Psitos
*Attorney, Agent, or Firm*—Burns, Doane, Swecker & Mathis

[57] ABSTRACT

A method and apparatus for localizing a source of faulty color operation of a color television receiver having an image producing element and a chassis providing signals to the image producing element through sockets in a chassis output signal connector removably received by an input signal connector on the image producing element. A plurality of visual voltage magnitude indicators are provided to visually indicate at least relative voltage levels of an applied signal. Each of the visual voltage magnitude indicators preferably comprises a light emitting means such as a neon glow lamp variable in brightness in response to variations in magnitude of applied voltage levels. Individual electrical connections are affected between each of a plurality of the sockets of the chassis output signal connector and respective ones of the plurality of visual voltage magnitude indicators with the chassis output signal connector removed from the image producing element input signal connector. A source of faulty operation of the television receiver can be thereby localized to either the image producing element or the chassis through manipulation of the customer color controls on the television receiver.

10 Claims, 4 Drawing Figures

METHOD AND APPARATUS FOR TESTING TELEVISION RECEIVERS

BACKGROUND OF THE INVENTION

The present invention relates to malfunction testing of television receivers and, more particularly, to a method and apparatus for more efficiently and expeditiously localizing a source of faulty operation in a color television receiver.

Faulty color operation of a color television receiver can be attributable to either the color television image producing element (e.g. the three gun cathode ray picture tube) or the chassis circuitry which controls the operation of the tube by supplying control signals to the picture tube through plural sockets in an output signal connector removably received by an input signal connector on the picture tube. The television picture tube and chassis are therefore usually tested separately to determine which is the cause of the faulty operation.

The testing devices required for complete check out of the picture tube and chassis are usually quite complex. Many of these testing devices are cumbersome to transport and may also require certain specific power supplies which are not ordinarily available except at the repair shop. Additionally, the testing apparatus utilized is often sensitive to certain conditions such as heat and humidity and thus has to be operated in a closed environment. Furthermore, the testing apparatus is often enough too complex to be operated by a layman and requires a fairly detailed knowledge of both the operation of the television receiver and of the testing apparatus for successful testing. It has thus often been the practice, whenever faulty color operation occurs in a color television receiver, to either remove the entire receiver to a repair shop where the complex testing devices are located or to bring some of these testing devices to the locale of the receiver for preliminary analysis of the problem.

OBJECTS AND SUMMARY OF THE INVENTION

Accordingly it is an object of the present invention to provide a novel method and apparatus for localizing a source of faulty color operation of a color television receiver to either the chassis circuitry or the image producing element.

It is another object of the present invention to provide a novel apparatus for localizing a source of faulty color operation of a color television receiver, which apparatus is of a simple, self-contained and durable construction.

It is yet another object of the present invention to provide a novel method and apparatus for localizing a source of faulty color operation of a color television receiver, which method and apparatus can be quickly and efficiently used by either an expert or a layman and which does not require any detailed knowledge of the operation of television receivers.

It is a further object of the present invention to provide an improved method and apparatus for localizing a source of faulty color operation of a color television receiver, which method and apparatus can provide rapid and accurate results by the simple manipulation of customer color intensity controls available on the receiver.

It is yet a further object of the present invention to provide a novel method and apparatus for localizing a source of faulty operation of a color television receiver without the need for external power supplies.

These and other objects and advantages are accomplished in accordance with the present invention through the provision of a malfunction indicator comprising a plurality of visual voltage magnitude indicators for indicating at least relative voltage levels of an applied signal. The voltage magnitude indicators are preferably carried by a mounting plug provided with longitudinally extending electrodes with each of the plurality of voltage magnitude indicators electrically connected across a related pair of the electrodes. The electrodes of the malfunction indicator may be inserted into respective sockets provided on a chassis output signal connector in place of the electrodes of an input signal connector provided on the image producing element so that the color control signals which are normally applied to the image producing element are applied to the visual voltage magnitude indicators, and thus can be monitored. The source of faulty operation of the television receiver can thus be localized by monitoring the visual indicators while manipulating the customer color controls on the television receiver.

These together with other objects and advantages of the invention will become apparent to one skilled in the art to which the invention pertains from the following detailed description when read in conjunction with the accompanying drawings forming a part hereof, wherein like numerals refer to like parts throughout.

DETAILED DESCRIPTION

Figure 1:
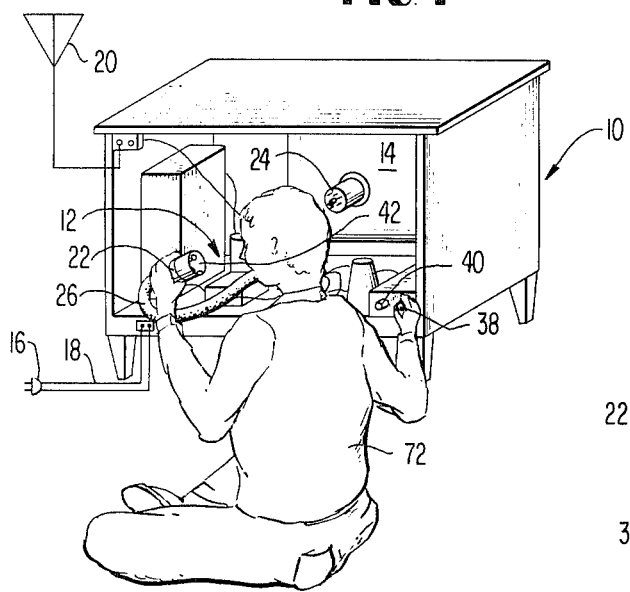
FIG. 1 is a perspective view of a color television receiver with an apparatus according to the present invention connected thereto.

In FIG. 1, the present invent is illustrated as employed in conjunction with a conventional color television receiver having an image producing element such as a conventional "three-gun" cathode ray picture tube. It should, however, be understood that the invention may be utilized in connection with other types of color image producing systems, such as those systems employing holographic or photostatic means to produce a color image.

For a proper understanding of the operation of the present invention it is necessary to comprehend certain features basic to the operation of a color television system.

In the present state of development of color television systems a television camera reduces an image into series of signals each representing a point in a scanning pattern which covers the image. Each point in the scanning pattern is characterized by a luminance, hue and saturation value present thereat. To reduce the luminance, hue and saturation values present at each point in the scanning pattern into easily manipulated signals, three picture signals, representative of the amounts of three primary colors present at each point in the scanning pattern are produced. From these signals, luminance and chrominance components are then derived by manipulation in electronic circuits. Thus a luminance signal is formed simply by applying the primary color signals to an electronic addition circuit which adds the values of the three signals at each point along the respective picture signal waveform. Since white light results from the addition, in appropriate proportions, of the primary colors, the resulting sum signal represents the black and white (luminance) version of the color image.

The luminance signal thus formed is subtracted individually, in three electronic subtraction circuits, from the original primary color signals, and the color difference signals are then further combined to produce two signals which represent the points on the orange-cyan and green-magenta axis of the chrominance diagram. These signals are then applied simultaneously to a modulator where they are mixed with a chrominance subcarrier signal. The latter is thereby amplitude modulated in accordance with the saturation values and phase modulated in accordance with the hues. The luminance and chrominance components are then combined to form an overall color picture signal, which is then carried to a transmitter for broadcasting.

A conventional color television receiver receives the broadcast signal and produces a color image from the received signal. The receiver contains, besides a three-gun cathode ray picture tube, chassis circuitry comprising a tuner and intermediate frequency amplifier especially designed to preserve the chrominance subcarrier during its passage through the circuit. The chassis circuitry also comprises power supplies, sound reception circuits and synchronization and deflection current generator. When the color picture signal is received by the color television receiver, a video detector develops the luminance component and applies it through video amplifiers simultaneously to all three electron guns of the picture tube. The chrominance subcarrier component appears in the output of the video detector and it thereupon operated on in electronic circuits which ultimately recover the primary color signals originally produced. This is followed by other electronic circuits which perform the inverse operations of the addition and subtraction circuits described above. The end result of this manipulation in the chassis circuitry is the production of three color difference signals which represent, respectively, the difference between the luminance signal applied to all three electron guns of the picture tube, and the primary color signals. The three color difference signals are applied separately through sockets in a chassis output signal connector, to the respective electron guns.

Referring now to FIG. 1, numeral 10 indicates generally a color television receiver or "set" having its back panel (not shown) removed to expose chassis circuitry 12 and an image producing element 14 associated with the set 10. The color television receiver 10 receives a.c. electrical power from a conventional power outlet plug 16 as indicated through the voltage supply line 18 and conventional overload protection devices. The transmitted color picture signal is received by means of an antenna 20 which couples the received scanning pattern to the color receiver 10. The chassis circuitry 12 includes several power supplies, sound reception circuits, synchronization and deflection generators, and amplifier circuits which operate on the received signal, in a manner above described, to ultimately recover the primary color signals originally produced. This is followed by other electronic circuits which perform additional operations on the received signals. The end result of this manipulation of the received signal in the chassis circuitry 12 is the production of three color difference signals which are applied separately through sockets, i.e., pin receptacles, in a chassis output signal connector 22 (shown in FIG. 2), to respective electrodes provided on an input signal connector 24 carried by the image producing element 14. The three color difference signals usually represent the three primary colors red, green and blue and are supplied from the chassis circuitry 12 to the chassis output signal connector 22 through separate wires designated in FIG. 1 by numeral 26.

Figure 2:
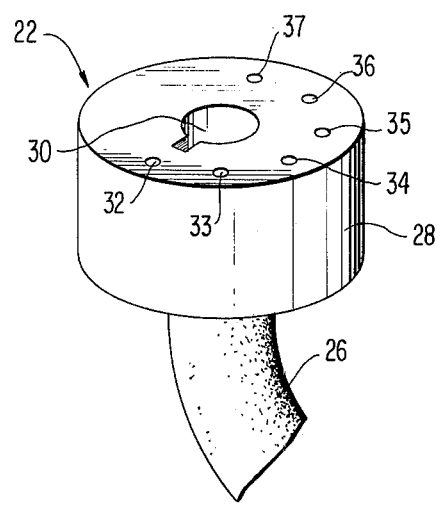
FIG. 2 is a perspective view of a chassis output signal connector for a color television receiver.

In FIG. 2, the chassis output signal connector 22 is shown to facilitate an understanding of the invention. The connector 22 comprises a cylindrical mounting plug 28 provided with an axially inwardly projecting keyed slot 30 arranged to receive a similarly shaped projection on the picture tube input signal connector. A plurality of sockets 32–37 are arranged in a circular pattern about the keyed slot 30. The three color difference signals, generated in the chassis circuitry 12, are applied separately to the sockets 32–37. For example, the primary color signal red may be applied through sockets 32 and 33 while the primary color signal blue may be applied through sockets 34 and 35 and the primary color signal green may be applied through sockets 36 and 37. It is understood, however, that the chassis output signal connector 22 is provided with other sockets for the supply of other signals, such as the luminance signal, to the image producing element 14. The keyed shaft 30 insures the proper alignment and orientation of the sockets with respect to the electrodes provided on the connector 24 of the image producing element 14.

The color television receiver 10 is also provided with a number of customer color intensity controls, e.g., hue or "tint" control 38 and saturation or "color" control 40. The hue control 38, for example, adjusts the timing of a synchronous detector. It sets the reference phase against which the phase modulation of the chrominance subcarrier is measured, and hence shifts all the hues in the image reproduced in image producing element 14. The hue control 38 is usually adjusted by reference to the color of the flesh of the performers, since unnatural flesh tone is readily recognized even if the viewer has no knowledge of the intended hues in other parts of the scene. The saturation control 40 adjusts the magnitudes of the color difference signals applied to the electron guns of the image producing element 14. When the magnitudes are reduced to zero, as by turning the saturation control 40 to the "off" position, no color difference action occurs and the reproduction occurs in monochrome. As the saturation control 40 is advanced, the color differences become more accentuated, and the colors become progressively more vivid. This control is adjusted to suit the personal preference of the viewer and the natural appearance of flesh tone is usually an appropriate index.

Figure 3:
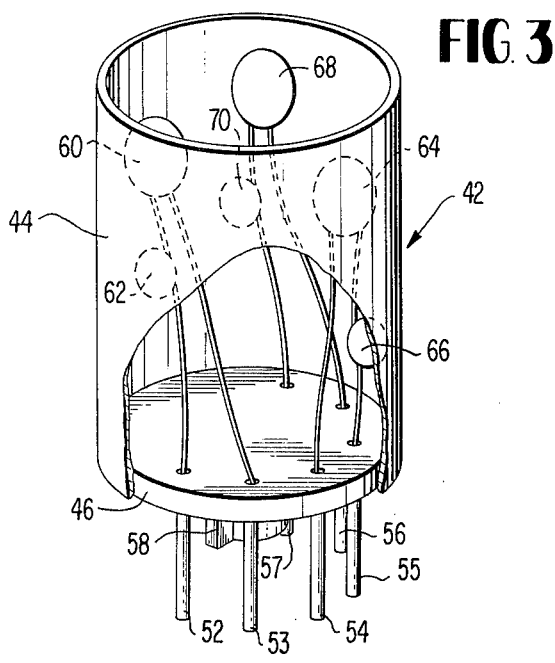
FIG. 3 is a perspective view in partial cross-section of an apparatus embodying the present invention and, FIG. 4 is a plan view of the apparatus of FIG. 3 showing the various components located therein.
Figure 4:
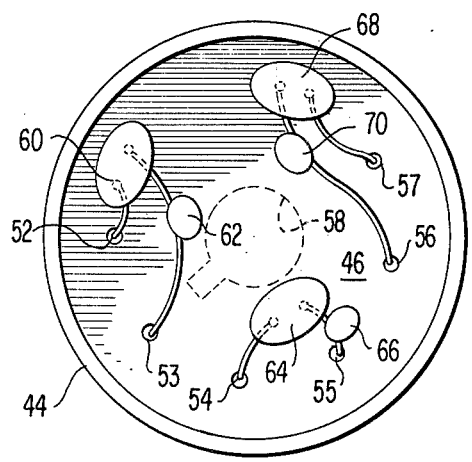

Referring now to FIGS. 3 and 4, a malfunction indicator 42 according to the present invention has an electrically insulative housing or mounting plug 44 of a cylindrical shape. The plug 44 is provided with a bottom portion 46 from which a plurality of electrodes 52–57 protrude longitudinally. The bottom portion 46 is also provided with an axially protruding keyed member 58 at a central portion thereof. The keyed member 58 is shaped to be received by the keyed slot 30 of the chassis output signal connector 22 (shown in FIG. 2).

The keyed member 58 insures the proper alignment and orientation of electrodes 52–57 with respect to the sockets 32–37 on the chassis output signal connector 22 when the electrodes are inserted into the sockets.

Connected across each related pair of electrodes is a visual voltage magnitude indicator, each indicator preferably comprising a neon glow lamp in series with a capacitor. Thus, as shown in FIG. 4, neon glow lamp 60 and capacitor 62 are connected in series across electrodes 52 and 53. Likewise, neon glow lamp 64 and capacitor 66 are connected in series across electrodes 54 and 55, while neon glow lamp 68 and capacitor 70 are connected in series across electrodes 56 and 57. Neon glow lamps 60, 64, 68, capacitors 62, 66, 70, and electrodes 52–57 are respectively interconnected by means of appropriate insulated wires.

The neon glow lamps 60, 64, 66 are of a suitable commercially available type and the capacitors 62, 66, 70 are likewise commercially available and may have a value of approximately 0.001 microfarad with a rating of about 1 K volt. However, it should be clear that capacitors having values other than 0.001 microfarad will not interfere with the proper operation of the malfunction indicator 15. For example, a 0.0002 microfarad capacitor has been used with satisfactory results.

In FIGS. 3 and 4, the neon lamps 60, 64, 66 are shown as being positioned within the cylindrical mounting plug 44. It will be appreciated however, that the neon lamps and the capacitors need not be situated within the cylindrical mounting plug 44. Rather, they may be situated outside the mounting plug 44 and may be connected thereto by flexible long lead wires to provide a greater degree of freedom of movement of the indicator. Furthermore, other types of visual voltage magnitude indicators may be used in the practice of this invention.

When malfunctions occur in the operation of a color television receiver 10, as shown in FIG. 1, often times the source of the malfunction cannot be readily determined. This is especially true when the image produced by the image producing element 14 is partially distorted as by either the total lack of color or the lack of one of the color components. The malfunction may have occurred in only one element of the chassis circuitry 12 or may have occurred in a component of the image producing element 14. It will be appreciated that it is therefore quite difficult to easily determine whether a malfunction in the operation of the color television receiver 10 is due to a malfunction in the image producing element 14 or the chassis circuitry 12 since the outward symptoms are often the same.

The inability to localize such a malfunction source to either the image producing element 14 or the chassis circuitry 12 often results in the entire television receiver being removed to a repair shop even though the malfunction may have occurred in a minor element in the chassis circuitry, such as an amplifier.

It will be further appreciated that the inability to quickly determine the source of malfunction in the receiver raises the total cost of repairs since the set will either have to be transported to the repair shop or expensive and often cumbersome testing equipment have to be brought to the locale of the receiver.

To localize the source of faulty operation of the color television receiver 10 a repair man may disengage the chassis input signal connector 22 from the input signal connector 24 provided on the image producing element 14 as is generally indicated at 72 in FIG. 1. Thereafter the malfunction indicator 42 may be connected to the chassis output signal connector 22 by inserting the electrodes 52–57 into the respective sockets 32–37 provided on the connector 22 (FIGS. 2 and 3).

After the color television receiver 10 has been energized, such as from power source 16, for a sufficient period to insure proper operation of the chassis electrical components, the malfunction indicator is visually monitored for the presence of applied signals. The repairman may then manipulate the respective customer color intensity controls 38, 40 and visually monitor the neon glow lamps 60, 64 and 68.

It will be appreciated that when the hue control 38 is manipulated the timing of the synchronous detector is adjusted and the reference phase against which the phase modulation of the chrominance subcarrier is measured, is changed. Accordingly, all the hues are shifted in the reproduced image. Therefore, the respective levels of brightness in all three neon lamps should vary in unison thereby indicating that the relative levels of all three chassis output voltages are varying. In a similar fashion, manipulation of the saturation control 40 adjusts the magnitudes of the color difference signals applied to the related pairs of sockets. Therefore a contrast in brightness should develop between the neon glow lamps 60, 64, 68. The failure of any of the neon glow lamps 60, 64, 68 to energize or to vary in intensity relative to the other neon glow lamps when the customer color intensity controls 38 and 40 are manipulated should indicate that the source of faulty operation of the receiver 10 is in the chassis circuitry 12. On the other hand, if the neon glow lamps indicate the presence of the applied signals and that these signals vary together or relative to one another in brightness when the respective customer color intensity controls 38 and 40 are manipulated, the source of faulty operation of the receiver 10 can be localized to the image producing element 14.

The present invention may be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A malfunction indicator for color television receivers having a chassis providing color control output signals to an image producing element through sockets in a chassis output signal connector comprising:
   an electrically insulative mounting plug;
   a plurality of electrodes carried by said plug for insertion into the sockets of the chassis output signal connector of the television set; and,
   a plurality of voltage magnitude indicating means each connected across a related pair of said plurality of electrodes, such that each of said voltage magnitude indicating means is responsive to the magnitude of a voltage differential applied across the related pair of said plurality of electrodes, said voltage magnitude indicating means thereby providing an indication of a malfunction of the chassis or the image producing element with said electrodes inserted into the sockets of said chassis output signal connector to receive the color control output signals.

2. A malfunction indicator for color television receivers according to claim 1, wherein each of said voltage indicating means comprise light emitting means variable in brightness in response to variations in magnitude of applied voltage levels.

3. A malfunction indicator for color television receivers according to claim 1, wherein each of said voltage indicating means includes a neon glow lamp in series with a capacitor.

4. A malfunction indicator for color television receivers according to claim 1 wherein said plug is cylindrical in shape and includes a bottom portion from which said plurality of electrodes protrude longitudinally, said bottom portion being further provided with a keyed slot at a central portion thereof to receive a keyed shaft on said chassis output signal connector to insure the proper alignment and orientation of said electrodes with respect to the sockets on said output signal connector when said electrodes are inserted into said socket.

5. A malfunction indicator for color television receivers according to claim 4 wherein each of said plurality of voltage indicating means is mounted on said mounting plug.

6. A malfunction indicator for color television receivers according to claim 5, wherein each of said voltage indicating means comprise light emitting means variable in brightness in response to applied voltage levels.

7. A malfunction indicator for color television receivers according to claim 5 wherein each of said voltage indicating means includes a neon glow lamp in series with a capacitor.

8. Apparatus for localizing a source of faulty color operation of a color television receiver having an image producing element and a chassis providing signals to the image producing element through sockets in a chassis output signal connector removably received by an input signal connector on the image producing element, said apparatus comprising:
a plurality of visual voltage magnitude indicators for visually indicating at least relative voltage levels of an applied signal; and,
means for effecting individual electrical connections between each of a plurality of the sockets of the chassis output signal connector and respective ones of said plurality of visual voltage magnitude indicators with the chassis output signal connector removed from the image producing element input signal connector, whereby a source of faulty operation of the television receiver can be localized to either the image producing element or the chassis through manipulation of the customer color controls on the television receiver.

9. Apparatus for localizing a source of faulty operation of a color television according to claim 8, wherein each of said visual voltage magnitude indicators comprise light emitting means variable in brightness in response to variations in magnitude of applied voltage levels.

10. A method for localizing a source of faulty operation of a color television receiver having an image producing element and chassis providing signals to the image producing element through sockets within a chassis output signal connector removably received by an input signal connector on the image producing element, said signals varying in intensity in response to the manipulation of respective customer color intensity controls provided on said receiver, comprising the steps of:
a. disengaging the chassis output signal connector from the input signal connector on the image producing element;
b. connecting to related pairs of the sockets of the chassis output signal connector, indicator means for visually indicating at least relative voltage levels of an applied signal;
c. energizing the color television set for a sufficient period of time to insure proper operation of the chassis electrical components;
d. visually monitoring the indicator means for the presence of applied signals;
e. manipulating the respective customer color intensity controls; and,
f. visually monitoring the indicator means for variations in the relative voltage levels of each applied signal responsive to the manipulation of the respective customer color intensity controls, the failure of the indicator means to indicate either the presence of one or more of the applied signals or the variations in the relative voltage levels of each applied signal when the respective customer color intensity controls are manipulated localizing the source of faulty operation of the color television receiver to the chassis.

* * * * *